United States Patent
Okumura

(10) Patent No.: US 6,386,722 B2
(45) Date of Patent: May 14, 2002

(54) BACKLIGHT UNIT FOR USE IN PLANAR DISPLAY

(75) Inventor: Daimon Okumura, Osato-gun (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/740,886

(22) Filed: Dec. 21, 2000

(30) Foreign Application Priority Data

Dec. 24, 1999 (JP) .......................................... 11-368271

(51) Int. Cl.<sup>7</sup> ................................................. F21V 7/04
(52) U.S. Cl. ............................ 362/31; 362/27; 362/226
(58) Field of Search ................................. 362/261, 271, 362/311, 226; 349/65

(56) References Cited

U.S. PATENT DOCUMENTS 5,537,296 A  *  7/1996  Kimura et al. ............... 362/226
6,108,060 A  *  8/2000  Funamoto et al. ............ 362/31

* cited by examiner

*Primary Examiner*—Stephen Husar
(74) *Attorney, Agent, or Firm*—Pillsbury Winthrop LLP

(57) ABSTRACT

A backlight unit for use in liquid crystal displays. The backlight unit has a light guide plate that is almost rectangular, a tubular light source arranged at one side of the light guide plate, and a frame supporting the light guide plate and the tubular light source. Two connection cables are connected to the ends of the tubular light source, respectively. Holders made of rubber are mounted on junctions, each between an end part of one tubular light source and one connection cable. Each holder comprises a main body and hollow cylindrical extensions formed integral with the main body and extending therefrom. The main body has a hole in which an end part of the tubular light source is fitted. Each extension has a hole communicating with the hole of the main body. One end of each connection cable is inserted in one extension. Each extension directly covers one end part of a connection cable.

7 Claims, 5 Drawing Sheets

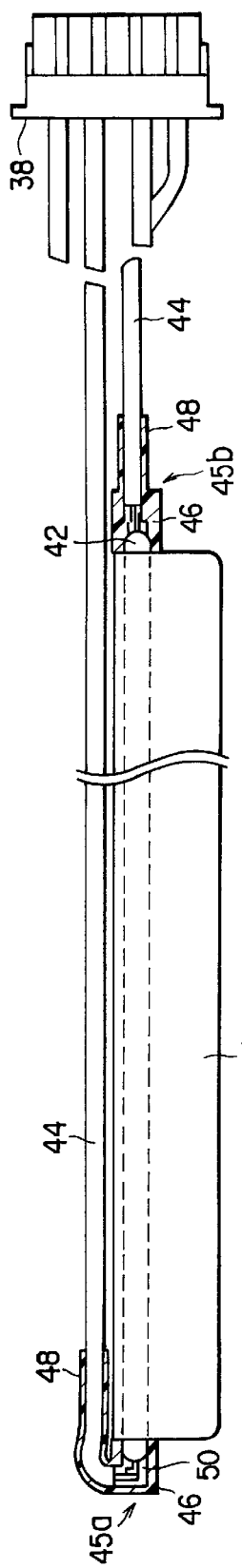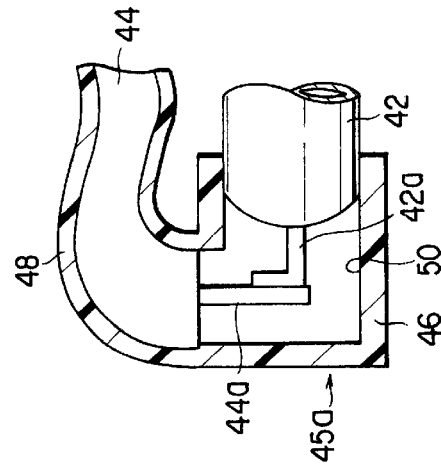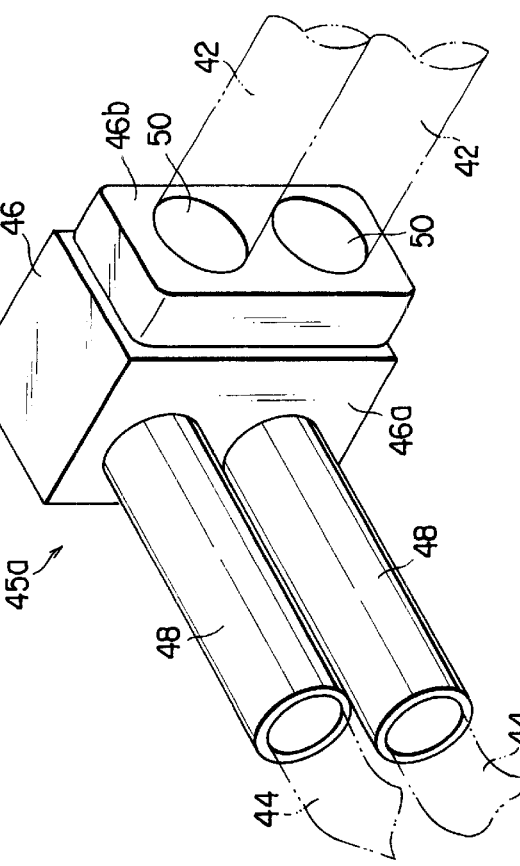
FIG. 4
FIG. 6
FIG. 5

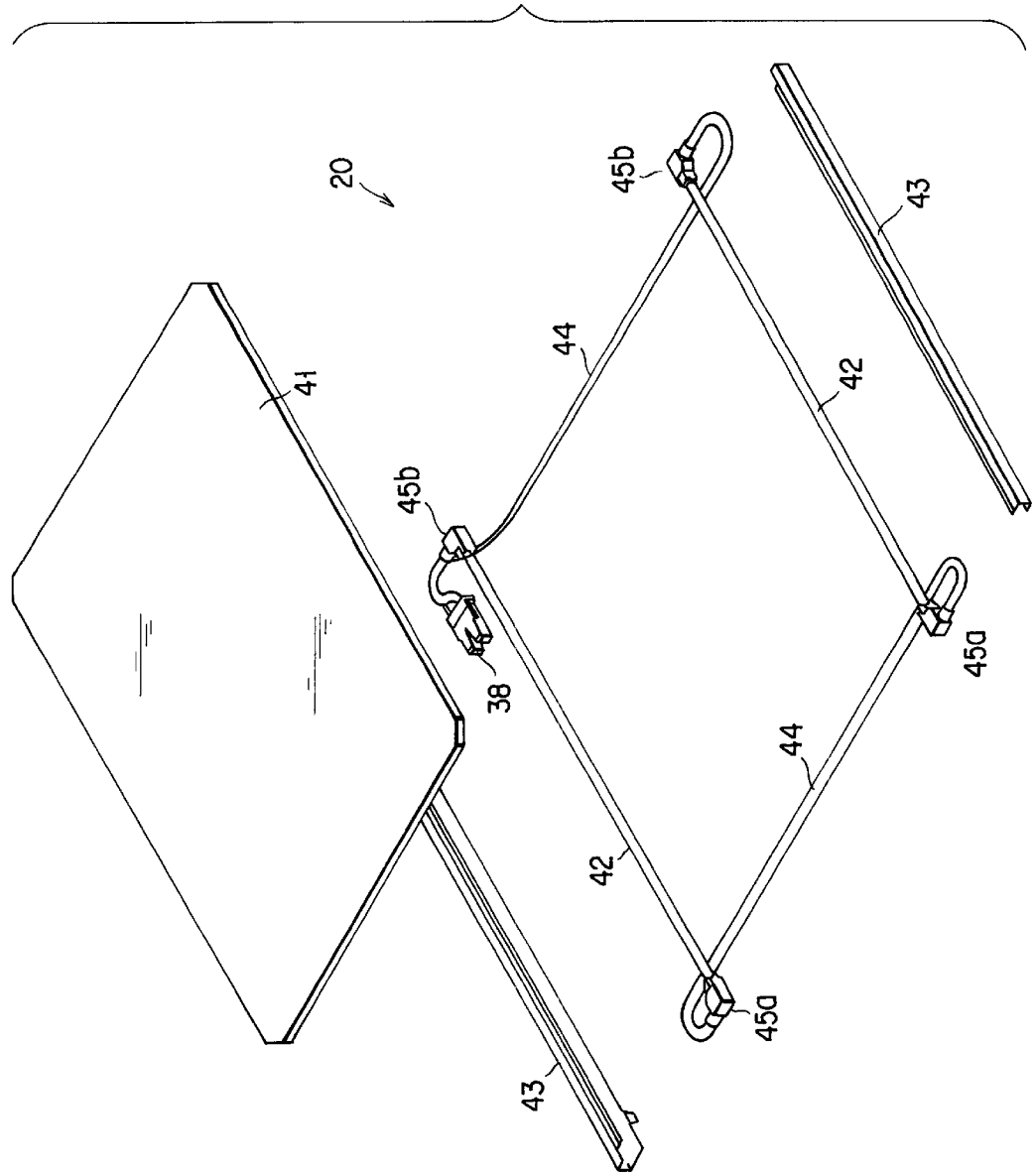

BACKLIGHT UNIT FOR USE IN PLANAR DISPLAY

CROSS-REFERENCE TO RELATED APPLICATIONS

This application is based upon and claims the benefit of priority from the prior Japanese Patent Application No. 11-368271, filed Dec. 24, 1999, the entire contents of which are incorporated herein by reference.

BACKGROUND OF THE INVENTION

The present invention relates to a backlight unit for use in a planer display represented by a liquid crystal display device, and more particularly to a backlight unit comprising rubber holders.

In recent years, planar displays represented by a liquid crystal display are used as TV displays, computer displays, car-navigation system displays and the like. This is because they are thin and light and consume but a little power.

A liquid crystal display, for example, comprises a light-transmitting liquid crystal display panel, a backlight unit, and a frame and a bezel, in most cases. The liquid crystal display panel comprises a pair of parallel substrates and a liquid crystal layer held between the substrates. The backlight unit is arranged on one surface of the liquid crystal display panel. The bezel made of metal is secured to the frame that is made of resin. The display panel and the backlight unit are mounted on the frame, partly held between the bezel and the frame. The liquid crystal display further comprises a drive circuit board for supplying drive signals to the panel. The drive circuit board is mounted on the frame, opposing the back of the backlight unit so as to reduce the width of the peripheral portion of the display device, that is, the with of the bezel.

Most backlight units comprise a light guide plate, a tubular light source, and a reflecting plate. The light guide plate is made of acrylic resin. One of the light guide plate serves as light-emitting surface. The tubular light source is positioned, extending along one side of the light guide plate. The reflecting plate covers the tubular light source. Light-scattering member is printed or provided on the back of the light guide plate. This member is made of acrylic resin, i.e., the same material as the light guide plate. The ends of the tubular light source are connected to a connector through cables, respectively.

A heat-shrinkable tube is fitted on the junction between each cable and an end of the light source. Further, two holders made of rubber are mounted on the end portions of the light source, respectively. Each holder covers the junction between one cable and one end of the light source is mounted on each end portion.

In the backlight units, the cables are led toward one side of the tubular light source. One cable, for example, the low-voltage cable, is inevitably bent at the part near the junction. A stress may likely be imposed on the bent part of the cable, impairing the electrical connection between the cable and the light source. Consequently, the tubular light source will fail to emit sufficient light or will emit smoke. Further, the sheath of the cable may be broken at the bent part, due to the stress applied on the bent part. Persons who repair the backlight unit may suffer from electric shocks.

The junction between each cable and an end of the light source must not be exposed. To this end, a heat-shrinkable tube is mounted on the junction. This decreases the productivity of the backlight unit and, ultimately, raises the price thereof.

BRIEF SUMMARY OF THE INVENTION

The present invention has been made in view of the foregoing and its object is to provide a backlight unit in which insufficient electrical connection is prevented and the number of components is decreased and which, therefore, excels in productivity and operating reliability.

To attain the object, a backlight unit according to the invention comprises: a light guide plate that is almost rectangular: a tubular light source arranged at one side of the light guide plate; a frame supporting the light guide plate and the tubular light source; connection cables connected to ends of the tubular light sources; and holders made of elastic material and mounted on junctions, each between an end part of one tubular light source and one connection cable. Each of the holders comprises a main body and hollow cylindrical extensions formed integral with the main body and extending therefrom. The main body has a hole in which an end part of the tubular light source is fitted. Each extension has a hole communicating with the hole of the main body. One end of each connection cable is inserted in one extension, and each extension directly covers one end part of a connection cable.

In the backlight unit, the holders reduce the stress on the junctions between the tubular light source and the end parts of the connection cables. This prevents the connection cables from being disconnected from the light source and insufficient electrical connection between the cables and the light source. Hence, the backlight unit can have its operating reliability enhanced. Further, since the holders are made of elastic material and flexible, the connection cables can be easily bent even though they are covered by the holders. Moreover, the holders are more durable than the conventional coatings and are hardly broken, thus preventing those people who repair the backlight unit from suffering from electric shocks. In addition, a heat-shrinkable tube need not be used as in the conventional backlight unit. This helps to increase the productivity of the backlight unit and, ultimately, to lower the manufacturing cost of the backlight unit.

Another backlight unit according to the invention comprises: a light guide plate that is almost rectangular; a tubular light source arranged at one side of the light guide plate; a frame supporting the light guide plate and the tubular light source; connection cables connected to ends of the tubular light sources; and holders made of elastic material and mounted on junctions, each between an end part of one tubular light source and one connection cable. Each of the holders comprises a main body and hollow cylindrical extensions formed integral with the main body and extending therefrom. The main body has a hole in which an end part of the tubular light source is fitted, and each extension has a hole communicating with the hole of the main body. One end of each connection cable is inserted in one extension, each extension directly covers one end part of a connection cable. Each of the connection cables has wires and a sheath covering the wires. The end of the sheath of each connection cable is located closer to the main body of one holder than to a junction between main body and the extension.

In this backlight unit, the junction between the main body and extension of each holder, i.e., the bent part of the holder, is spaced apart not only from the wires of the of the connection cables. Hence, the holders reduce the stress applied at the junction between the tubular light source and one connection cable, and the stress applied on the wires of each connection cable. This prevents the cables from being disconnected from the light source and insufficient electrical connection between the cables and the light source. The backlight unit can have its operating reliability enhanced.

As described above, the present invention can provide a backlight unit in which insufficient electrical connection is prevented and a small number of components are provided and which, therefore, excels in productivity and operating reliability.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4 is a plan view showing the tubular light source, connection cables and reflecting plate of the backlight unit;

FIG. 5 is a perspective view showing the holder made of rubber and used in the backlight unit;

FIG. 6 is an enlarged sectional view illustrating the holder and the junction between the tubular light source and the connection cables, provided in the backlight unit;

FIG. 7 is an exploded view of a backlight unit according to the second embodiment of the invention;

DETAILED DESCRIPTION OF THE INVENTION

A liquid crystal display that incorporates a backlight unit according to the invention will be described in detail, with reference to the accompanying drawings.

Figure 1:
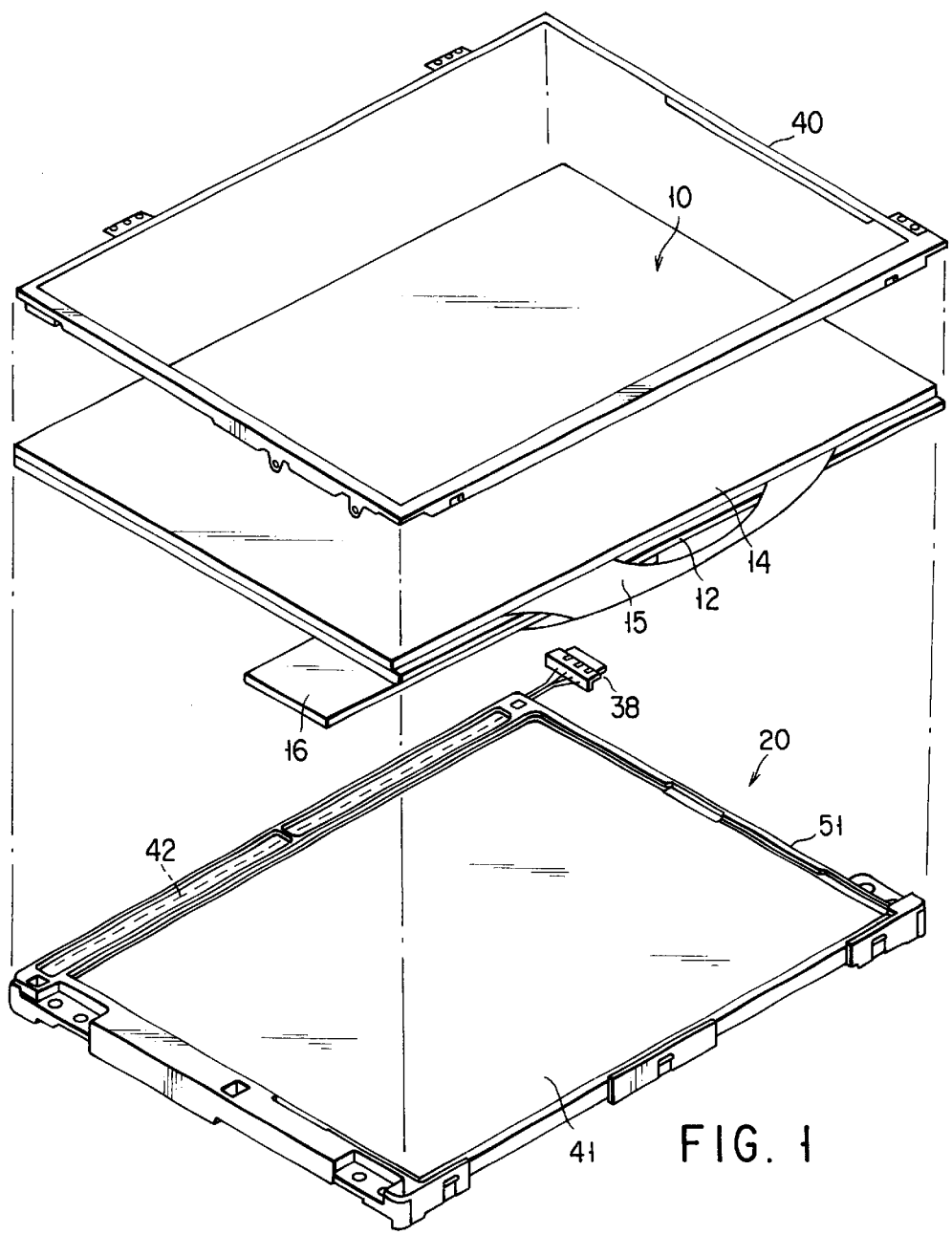
FIG. 1 is an exploded view of a liquid crystal display incorporating a backlight unit that is the first embodiment of the present invention.

As shown in FIG. 1, the liquid crystal display comprises a liquid-crystal display panel 10, a backlight unit 20, and a bezel 40. The panel 10 is a rectangular, light-transmitting liquid crystal display panel. The backlight unit 20 is almost rectangular, arranged on the back of the liquid-crystal display panel 10. The backlight unit 20 has a rectangular frame 51 made of resin. The bezel 40 is a rectangular frame made of metal. The bezel 40 is mounted on the peripheral edge portion of the panel 10 and connected to the frame 51 of the backlight unit 20. Therefore, the liquid-crystal display panel 10 is held between the backlight unit 20 and the bezel 40. The bezel 40 is formed of, for example, a stainless steel plate having a thickness of 0.2 mm.

The liquid-crystal display panel 10 comprises a rectangular array substrate 12, a counter substrate 14, and a liquid crystal layer (not shown) sealed between the array substrate 12 and counter substrate 14. A number of display pixels (not shown), switching elements, wires, and a drive circuit are provided on the array substrate 12 to thereby constituting a rectangular effective region. The drive circuit comprises an analog sample-hold circuit and the like. A flexible printed circuit (FPC) board 15 connects a drive circuit board 16 to the array substrate 12. The drive circuit board 16 includes a digital-to-analog converting (DAC) circuit. The drive circuit board 16 is arranged on the back of the backlight unit 20.

Figure 2:
FIG. 2 is a sectional view of the backlight unit.
Figure 3:
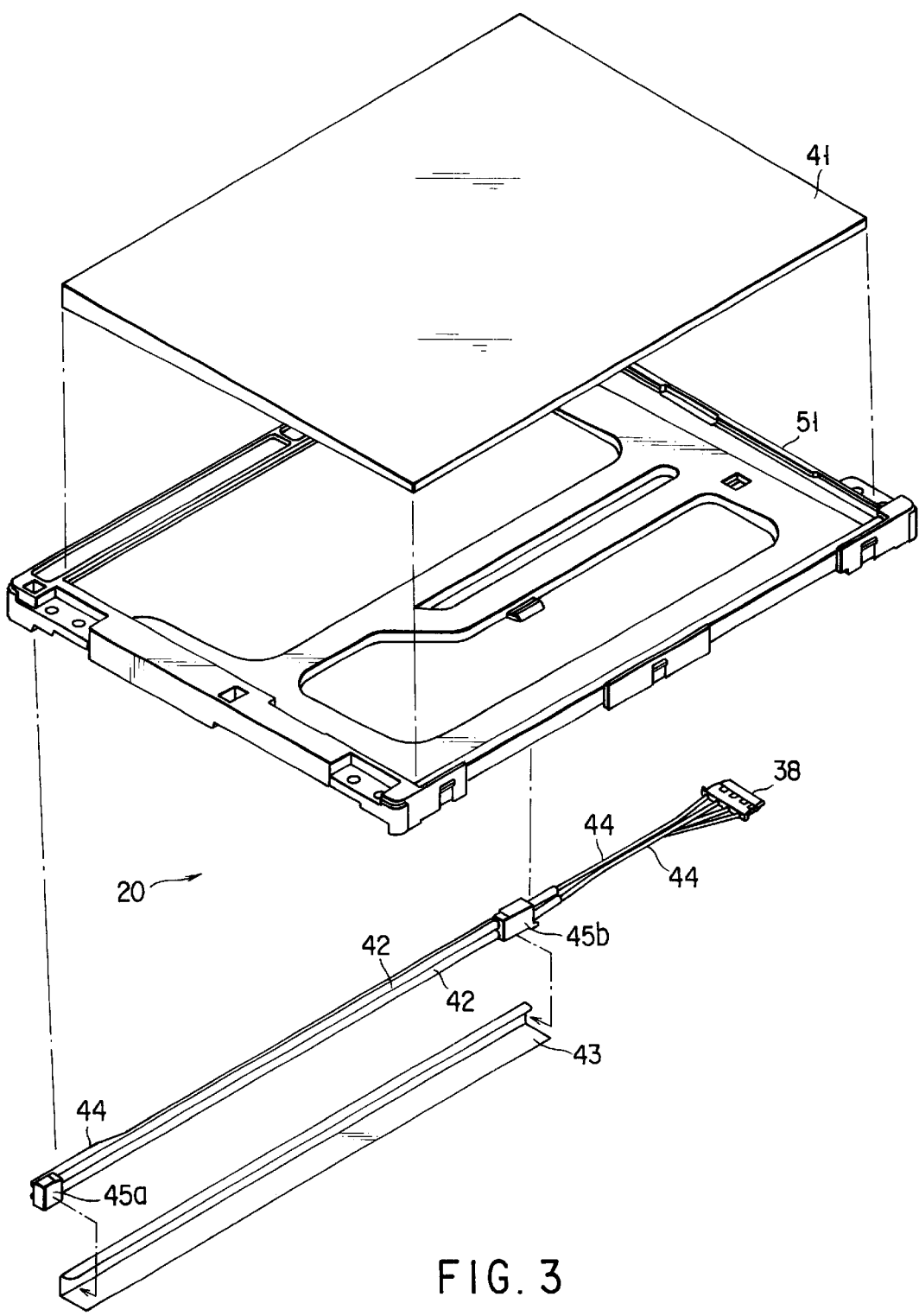
FIG. 3 is an exploded view of the backlight unit.

As seen from in FIGS. 1 to 3, the backlight unit 20 is a light source unit of side-edge type. It comprises a rectangular light guide plate 41 and a light-scattering sheet (not shown), in addition to a frame 51. The light guide plate 41 is made of acrylic resin and emits light from its upper surface. The light-scattering sheet is adhered to, or printed on, the lower surface of the light guide plate 41. The frame 51 is made of resin and supports the light guide plate 41.

The backlight unit 20 comprises two tubular light sources 42 and a reflecting plate 43. The tubular light sources 42 are combined, forming a light source unit. The light source unit extends along one side of the light guide plate 41. The reflecting plate 43 is shaped like a trough, having a U-shaped cross section. The plate 43 is curved around the tubular light sources 42, efficiently guiding light from the light sources 42 to the light guide plate 41. The light guide plate 41, tubular light sources 42 and reflecting plate 43 are fitted in the frame 51 and held at prescribed positions.

Connection cables 44 are connected at one end to the tubular light sources 42, and at the other end to a connector 38. The connector 38 is connected to an inverter (not shown).

As shown in FIGS. 3 to 6, two holders 45a and 45b, both made of elastic material such as rubber, are fitted on the end parts of the light source unit. The holder 45a, which is mounted on one end part of the light source unit, comprises a rectangular main body 46 and two hollow cylindrical extensions 48. The extensions 48 are formed integral with the main body 46 and protrude from one side 46a of the main body 46. The extensions 48 extend in a direction perpendicular to the side 46a.

The main body 46 has two holes 50. The holes 50 open at a side 46b of the main body 46, which exists in a plane perpendicular to the side 46a from which the hollow cylindrical extensions 48 protrude. One end part of one tubular light source 42 is fitted into one of the holes 50. One end part of the other tubular light source 42 is held in the other hole 50. The holes 50 communicate with the inner holes of the extensions 48, respectively.

The connection cables 44 have their end parts inserted in the hollow cylindrical extensions 48. In other words, the extensions 48 cover the end parts of the respective connection cables 44. The wires 44a projecting from the ends of the cables 44 are connected to the terminals 42a of the tubular light sources 42, respectively. The connections between the wires 44a and the terminals 42a are located in the holes 50 and, therefore, protected by the holder 45a.

The holder 45b that is mounted on the other end part of the light source unit is similar in structure to the holder 46a described above. The holder 46b differs in that the hollow cylindrical extensions 48 protrude from that side of the main body 46, which opposes the side in which holes 50 are opened. Thus, the extensions 48 of the holder 46b are almost coaxial with the holes 50.

The main bodies 46 of both holders 45a and 45b are fitted in the end parts of the reflecting plate 43, respectively.

Therefore, the holders 45a and 45b hold the tubular light sources 42 at predetermined positions with respect to the reflecting plate 43. The connection cables 44 are led from the holder 45a mounted on one end of the light source unit, are bent around the outer surface of the reflecting plate 43, and extend to the other end of the light source unit. The extensions 48 of the holder 45a are therefore bent, whereas the extensions 48 of the holder 45b are straight, not bent at all.

In the backlight unit 20 constructed as described above, the hollow cylindrical extensions 48 are formed integral with the holders 45a and 45b, both made of rubber, and the holders are fitted in the end parts of the reflecting plate 43. The connection cables 44 have their end parts inserted in the hollow cylindrical extensions 48 and directly covered with the extensions 48. The stress on the junction between each tubular light source 42 and an end part of the connection cable 44 is thereby reduced. This prevents the connection cables 44 from being disconnected from the light sources 42 and insufficient electrical connection between the cables 44 and the light sources 42. Hence, the backlight unit 20 can have its operating reliability enhanced.

Since the holders 45a and 45b are made of rubber and, therefore, soft and flexible, making it easy to bend the connection cables 44. Further, the holders 45a and 45b are more durable than the conventional ones and are hardly broken, thus preventing those person who repair the backlight unit 20 from suffering from electric shocks.

Further, the holders 45a and 45b, both made of rubber, serve as sheath of the connection cables 44. Thus, it is not necessary to mount a heat-shrinkable tube on the junction between each cable 44 and an end of the light source 42, as in the conventional backlight unit. This helps to increase the productivity of the backlight unit and, ultimately, to lower the manufacturing cost of the backlight unit.

A backlight unit 20 according to another embodiment of the present invention will be described.

As shown in FIG. 7, the backlight unit 20 comprises a light guide plate 41, two tubular light sources 42, and two reflecting plates 43. The light guide plate 41 is rectangular. The light sources 42 are arranged, extending along the opposing two sides of the light guide plate 41, respectively. Each reflecting plate 43 is shaped like a trough, having a U-shaped cross section. The first reflecting plate 43 is curved around the first tubular light source 42, efficiently guiding light from the first light source 42 to the light guide plate 41. Similarly, the second reflecting plate 43 is curved around the second tubular light source 42, efficiently guiding light from the second light source 42 to the light guide plate 41.

A connection cable 44 is connected at one end to one end of the first tubular light source 42 and at the other end to one end of the second tubular light source 42. Another connection cable 44 is connected at one end to the other end of the first tubular light source 42 and at the other end to the other end of the second tubular light source 42. An extension of the first connection cable 44 is connected to a connector 38. The connector 38 is connected to an inverter (not shown).

Figure 8:
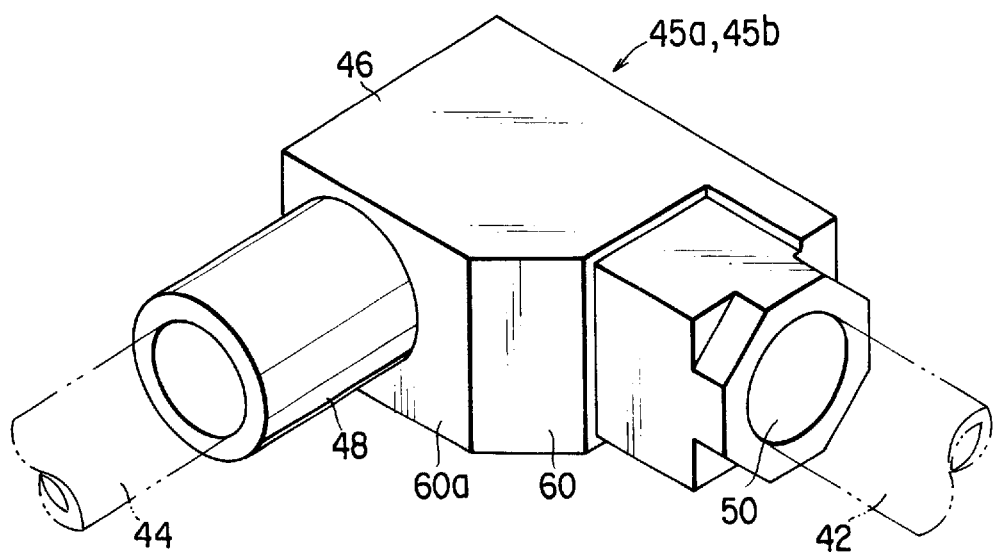
FIG. 8 is a perspective view of the second embodiment shown in FIG. 7.
Figure 9:
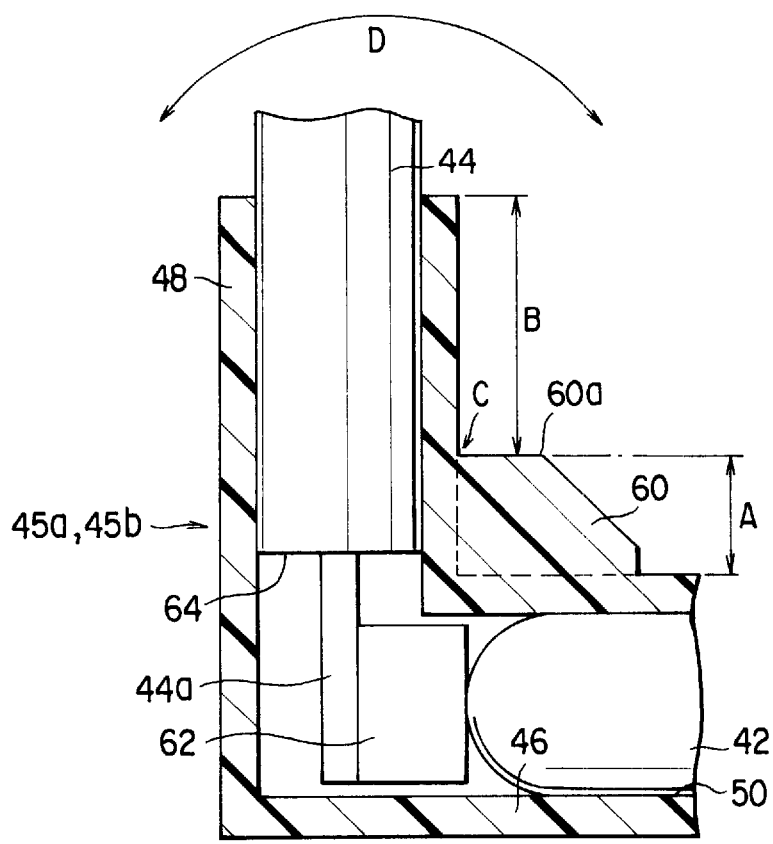
FIG. 9 is an enlarged sectional view depicting the holder and the junction between the tubular light source and the connection cables, provided in the first embodiment.

As shown in FIGS. 7 to 9, the backlight unit 20 further comprises two holders 45a and two other holders 45b, all made of rubber. The first holder 45a holds the junction between the first light source 42 and the first connection cable 44. Similarly, the second holder 45a holds the junction between the second light source 42 and the first connection cable 44. Each of the holders 45a comprises a rectangular main body 46 and a hollow cylindrical extension 48. The extension 48 is formed integral with the main body 46. The extension 48 protrudes from the main body 46 in a direction perpendicular to one side of the main body 46.

The main body 46 of each holder 45a has a hole 50. The hole 50 opens at another side of the main body 46. An end part of the first tubular light source 44 is inserted in the hole 50. The hole 50 communicates with the interior of the extension 48. The extension 48 is positioned, with its axis intersecting at right angles to the axis of the hole 50. The main body 46 has a projection 60 that reinforces the extension 48.

One end part of the connection cable 44 is inserted in the extension 48 and directly covered with the extension 48. Wires 44a protruding from the end of the cable 44 are connected to a spacer 62 made of metal. The spacer 62 is connected to a terminal of the tubular light source 42. The junction between the spacer 62 and the terminal exists in the hole 50 and is protected by the holder 45a. One end 64 of the sheath of the connection cable 44 is located closer to the light source 42 than the upper surface of the projection 60. That is, the end 64 exists close to the main body 46 of the holder 45a.

In the holders 45a, the projections 60 have height A of 1.3 mm or more, and the extension 48 have height B of 2.9 mm or more and wall thickness of 0.4 mm or more.

The third and fourth holders 45b, which hold the other end of the first light source 42 and the other end of the second light source 42, respectively, have the same structure as the first and second holders 45a. The main body of each of the holders 45a and 45b are fitted in the end parts of the reflection plates 43, securing the tubular light sources 42 to the reflection plates 43.

In the backlight unit 20 shown in FIGS. 7 to 9, the holders 45a and 45b, all made of rubber, are mounted on the ends of the tubular light sources 42, and the hollow cylindrical extensions 48 are formed integral with the rubber holders 45a and 45b. The end parts of the connection cables 44 are directly inserted in, and thus directly covered by, the extensions 48.

The extensions 48 of the holders 45a and 45b may be bent, thereby to guide the connection cables 44 to desired directions. When each extension 48 is bent, it is bent at the junction C between the extension 48 and the projection 60 of the main body 46. The junction C is spaced apart not only from the end 64 of the sheath of the connection cable 44, but also from the exposed wires 44a of the cable 44.

Therefore, the holders 45a and 45b reduce the stress applied at the junction between each tubular light source 42 and one connection cable 44, and the stress applied on the wires 44a of each connection cable 44. This prevents the cables 44 from being disconnected from the light sources 42 and insufficient electrical connection between the cables 44 and the light sources 42. The backlight unit 20 shown in FIGS. 7 to 9 can have its operating reliability enhanced.

Experiments were conducted with a backlight unit of the conventional type and a backlight unit of the type shown in the above-mentioned embodiment. In the experiments, the connection cables of both types were repeatedly bent, each time by 180°, in the direction of arrow D as is illustrated in FIG. 9. In the case of the conventional backlight unit, the junction between a tubular light source and the wires of a connection cable was broken when the connection cable was bent for the eighth time. On the other hand, the junction was not broken in the backlight unit of this invention until the junction was bent for the eighty-ninth times. Thus, the backlight unit according to the embodiment was found about ten times as durable as the conventional one.

Made of rubber, all holders 45a and 45b used are soft and flexible. Those parts of the connection cables 44, which are covered with the holders 45a and 45b, can be bent, almost as easily as in the case they are not covered at all. Moreover, the holders 45a and 45b are hardly broken, thus preventing those person who repair the backlight unit 20 from suffering from electric shocks.

Still further, in the second embodiment (FIGS. 7 to 9), the holders 45a and 45b, both made of rubber, serve as sheath of the connection cables 44, as well. There is no need to mount a heat-shrinkable tube on the junction between each cable 44 and an end of the light source 42, as in the conventional backlight unit. The productivity of the backlight unit is therefore enhanced, and ultimately, the backlight unit can be manufactured at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A backlight unit comprising:

a light guide plate that is almost rectangular:

a tubular light source arranged at one side of the light guide plate;

a frame supporting the light guide plate and the tubular light source;

connection cables connected to ends of the tubular light sources; and holders made of elastic material and mounted on junctions, each between an end part of one tubular light source and one connection cable, wherein each of the holders comprises a main body and hollow cylindrical extensions formed integral with the main body and extending therefrom, the main body has a hole in which an end part of the tubular light source is fitted, each extension has a hole communicating with the hole of the main body, one end of each connection cable is inserted in one extension, and each extension directly covers one end part of a connection cable.

2. A backlight unit according to claim 1, which further comprises another tubular light source arranged at the one side of the light guide plate, side by side with said tubular light source, and in which each of the holders comprises a main body and two hollow cylindrical extensions formed integral with the main body and extending therefrom, the main body has two holes in which end parts of the two tubular light sources are fitted, and end parts of the connection cables are inserted in and directly covered by the hollow cylindrical extensions, respectively.

3. A backlight unit according to claim 1, which further comprises a reflecting plate for reflecting light emitted from the tubular light source, and in which the main bodies of the holders are fitted in the reflecting plate, thus positioning the tubular light source with respect to the reflecting plate.

4. A backlight unit comprising:

a light guide plate that is almost rectangular;

a tubular light source arranged at one side of the light guide plate;

a frame supporting the light guide plate and the tubular light source;

connection cables connected to ends of the tubular light sources; and holders made of elastic material and mounted on junctions, each between an end part of one tubular light source and one connection cable, wherein each of the holders comprises a main body and hollow cylindrical extensions formed integral with the main body and extending therefrom, the main body has a hole in which an end part of the tubular light source is fitted, each extension has a hole communicating with the hole of the main body, one end of each connection cable is inserted in one extension, each extension directly covers one end part of a connection cable, each of the connection cables has wires and a sheath covering the wires, and ends of the sheath of each connection cable is located closer to the main body of one holder than to a junction between main body and the extension.

5. A backlight unit according to claim 4, wherein the main body of each holder has a projection formed integral with the main body and positioned at the junction between the main body and the extension.

6. A backlight unit according to claim 4, which further comprises another tubular light source at the side of the light guide plate, opposing the one side thereof, and in which the holders are mounted on the end parts of the two tubular light sources, respectively.

7. A backlight unit according to claim 4, which further comprises a reflecting plate for reflecting light emitted from the tubular light source, and in which the main bodies of the holders are fitted in the reflecting plate, thus positioning the tubular light source with respect to the reflecting plate.

* * * * *